July 14, 1931.  H. HAASE  1,814,032
METALLIC BALL HEAD HINGE FOR NONMETALLIC SPECTACLE FRAMES
Filed July 3, 1928
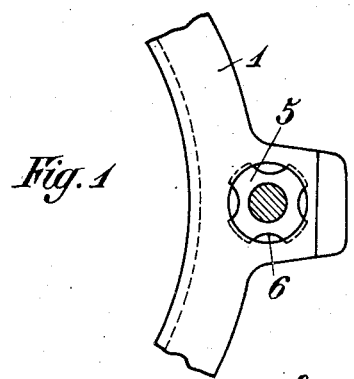
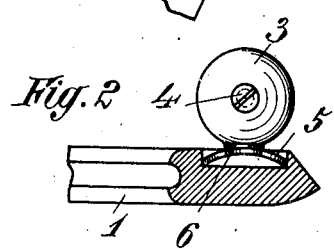
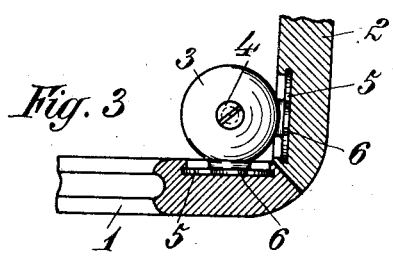
Inventor:
Heinrich Haase Patented July 14, 1931

1,814,032

UNITED STATES PATENT OFFICE

HEINRICH HAASE, OF RATHENOW, GERMANY

METALLIC BALL-HEAD HINGE FOR NONMETALLIC SPECTACLE-FRAMES

Application filed July 3, 1928, Serial No. 290,163, and in Germany November 8, 1927.

Metallic ball-head hinges for non-metallic spectacle frames have been manufactured up to now in this manner that each half of the hinge is provided with an angular lug and with a pin located upon this lug, these two members being then inserted into the frame members to be hinged to one another. Connecting the spectacle parts by hinges of that type necessitates that, prior thereto, cavities corresponding to the hinge-parts must be provided in the frame material, as otherwise dead play can arise at the cornered lug which may have the consequence of the holding bows becoming loose.

This drawback is overcome by the present invention, the characteristic feature of which resides therein that for the cornered lug with its fastening pin is substituted a vaulted shield, the circumference of which is practically circular and has recesses or gaps at only a few places. This shield is attached to the hinge parts and firmly connected with them by solder. Prior to attaching the hinge parts with said vaulted shields to the parts concerned of the spectacle frame, said parts are provided with circular shallow cavities, each of which is just large enough to receive one of said shields. When the shield has been inserted into the appertaining cavity, it is subjected to a pressure of such a strength that it assumes a flat shape, that is to say, is transformed into a disk, in consequence whereof its diameter becomes slightly larger and its rim with its edge is pressed into the spectacle material whereby the parts are firmly connected with one another. The working time is by far shorter than hitherto, less material is required, and the hinges are very securely connected with the frame body, as well as with the holding bows. These latter are, under normal conditions, absolutely prevented from getting loose.

The invention is illustrated diagrammatically and by way of example on the accompanying drawings, on which Figure 1 is a plan of one of the vaulted shields inserted into a spectacle part, Figure 2 is a section through a spectacle part and a hinge, the vaulted plate inserted into said part being not as yet pressed flat; and Figure 3 is a similar representation, showing a complete hinge connected with the appertaining spectacle frame parts, the inserted plates being here already in their flat, i. e. ultimate, state. All figures are drawn to an enlarged scale.

On the drawings, 1 denotes a part of the spectacle frame body, 2 a part of a holding bow, 3 a hinge, 4 a screw connecting the hinge members with one another, 5 the vaulted shield, or the flat plate into which the shield has been transformed respectively, and 6 are recesses provided in the rim of said shield or plate.

I claim:

A metallic hinge for non-metallic and recessed spectacle frames comprising a hinge member; and a dish-shaped elastic plate secured to the hinge member having radial projecting members adapted to be laterally forced into the recess of the frame of the spectacle whereby due to the elasticity of the plate the dish shape will become flat shaped to firmly secure the hinge by means of the projecting members in and to the frame.

In testimony whereof I affix my signature.

HEINRICH HAASE.